Aug. 6, 1957 — T. L. VITKIN — 2,801,773
DISPENSING APPARATUS
Filed Dec. 22, 1955

INVENTOR.
Theodore L. Vitkin

United States Patent Office 2,801,773
Patented Aug. 6, 1957

2,801,773

DISPENSING APPARATUS

Theodore L. Vitkin, Glencoe, Ill., assignor to Marmyte Co., Mundelein, Ill., a corporation of Illinois Application December 22, 1955, Serial No. 554,801

15 Claims. (Cl. 222—200)

The invention relates to improvements in material dispensing apparatus and is more particularly concerned with an agitating and/or vibrating dispenser including novel means to cause uniform uninterrupted flow of dry powdered material therefrom.

In the manufacture of fiber glass mats from which various articles are fabricated, a layer of strands of fiber glass is passed beneath an apparatus which distributes thereover a predetermined quantity of bonding resin in powdered form. The quality of the mat is adversely affected should the resin be distributed unevenly or in non-uniform quantities. Known types of resin distributors are unsatisfactory primarily because the resin has a tendency to pack within the dispensing passageways provided in the dispensing apparatus. When such packing occurs some or perhaps all of the passageways become blocked with the result that the necessary quantity of resin is not delivered to the layer and such resin that is delivered is not uniformly dispersed thereover. As a result the fibrous strands are insufficiently bonded and the strands fall out of the finished mat prior to or during subsequent processing into a finished article.

It is therefore an object of the invention to provide a novelly constructed apparatus for dispensing a powdered resin or the like uniformly and without interruption.

Although the present apparatus is described herein as being particularly useful for distributing dry powdered resin, such as a thermoplastic and/or thermosetting resin, during the manufacture of fiber glass mats, it should be understood that it is useful for distributing any granular substance that has a tendency to pack within the discharge passageways of the distributing apparatus. The present construction prevents clogging of the discharge passageways by the presence within each passageway of an agitator preferably in the form of a wobble pin. It is therefore, another object of the invention to provide an apparatus of the character referred to.

Another object of the invention is to provide a dispensing apparatus for powdered material with a reciprocable plate having a multiplicity of discharge passages therein each fitted with a wobble pin.

Another object is to provide a dispensing apparatus that is not complicated or expensive to construct, is very efficient in use, positive in its operation and which requires little or no servicing to maintain it operable.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
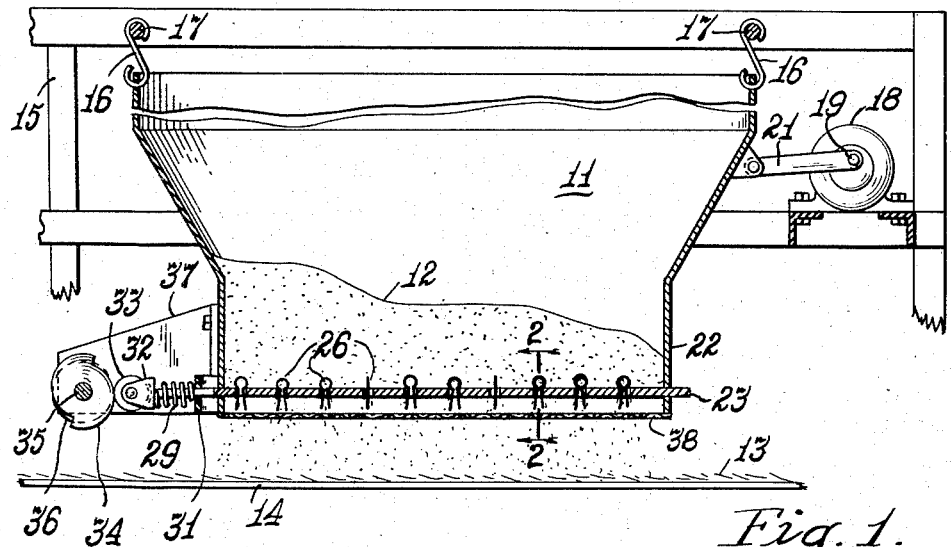
Fig. 1 is a vertical sectional view through a dispensing apparatus embodying the features of the present invention.
Figure 2:
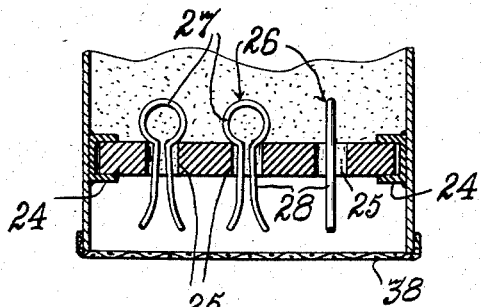
Fig. 2 is an enlarged transverse sectional detail view taken substantially on line 2—2 of Fig. 1.

Referring to the accompanying drawing, the apparatus selected for purposes of illustration includes a material container or hopper 11 adapted to have deposited therein a supply of finely powdered or granular material, such as for example, powdered resin 12, which is adapted to be fed therefrom in finely dispersed form for deposit upon a layer of fibrous material 13 carried therebeneath along and by means of an endless conveyor 14. The hopper 11 preferably is loosely supported by a frame 15 of any suitable construction preferably by means of links 16 attached at one end to the upper perimeter of the hopper 11 and at their other end to the frame 15 by means of transverse rods 17. Mounting the hopper 11 in this manner permits it to be agitated, oscillated or vibrated so as to insure continuous agitation of the material 12 contained therein during machine operation. Any suitable mechanism may be utilized for imparting the desired motion to the hopper 11, such as for example, the means illustrated, which includes a motor 18 operable to drive an eccentric 19 connected by a link 21 to said hopper.

The hopper 11 preferably converges at its lower end into a throat portion 22 which is substantially rectangular in cross-sectional area and open at its bottom. A floor plate 23, dimensioned to correspond substantially to the area of the throat portion 22, is arranged within said throat portion preferably closely adjacent to its open bottom end. As shown, the floor plate 23 is suitably mounted along its opposed longitudinal edges in longitudinal guides 24 which, in the present disclosure, are fashioned from opposed U-shaped channels, it being obvious that any structural characteristics may be imparted to said guides without departing from their function. The floor plate 23 is provided with a plurality of spaced discharge holes or passageways 25 which may be arranged therein in any desired pattern but are presently illustrated as being grouped in rows.

Mounted loosely in each hole 25 of the floor plate 23 is an agitator pin 26. These pins preferably are cotter pins each having a head 27 and split shank 28. The head 27 of each pin is of sufficient diameter so that the pin will not pass downwardly through the hole 25. As shown, the said heads rest upon the top surface of the floor plate 23 with the shanks 28 of the pins extending downwardly through and beyond the holes 25. The shank portions are of smaller cross section than the area of the holes. In order to prevent inadvertent displacement of the cotter pins 26, the split shanks 28 may be spread at their extremities, said spreading being effected in such a manner that free movement of the pins 26 within the holes 25 will not be impeded in any manner whatsoever.

Means is provided to reciprocate or otherwise move the floor plate 23 so as to cause the pins 26, supported in the openings or holes 25, to wobble within said holes. Such wobbling of the pins 26 prevents material passing downwardly through the holes 25 from becoming caked or otherwise packed or jammed within said holes, thus insuring free continuous uniform flow of the material 12 through the holes 25 at all times during machine operation. Reciprocation of the floor plate 25 may be accomplished in any manner. However, it is preferred that one end of the floor plate 23 project outwardly beyond the end wall of the throat portion 22 and be suitably reduced in size to receive thereover a spring 29 having one end in abutment with a plate 31 firmly secured to the hopper 11 and its other end in abutment with a block 32 carrying an anti-friction element, such as roller 33, that normally is held by the spring in surface contact with an eccentric 34 mounted on shaft 35 of a motor 36. The motor 36 and its eccentric 34 is mounted on and movable with the hopper 11 and to this end said motor and eccentric may be carried in a bracket 37 firmly secured to the end wall of the hopper 11.

It should be quite evident that during machine operation, at which time both motors 18 and 36 are in operation, the hopper 11 is vibrated so as to agitate the material contained therein. The floor plate 23 is reciprocated relative to the hopper 11 to cause wide dispersion of the material sifted through the holes 25. Said holes will not become clogged during machine operation owing to the continuous agitation resulting in wobbling of pins 36 in said holes 25 consequently, at all times during machine operation there is a continuous uninterrupted uniform flow of granular material 12 out through the bottom of receptacle 11 onto the material 13 passing therebeneath. If desired, a large mesh screen 38 may be arranged beneath the open mouth of the throat 22, below the floor plate 23, to further increase the dispersion of the material moving downwardly therethrough.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An apparatus for dispensing powdered material comprising a container for said material, said container having a material discharge opening, a plate bridging said opening, said plate having a plurality of holes therein through which material is discharged, means to vibrate said plate, and a plurality of headed members one suspended in each hole with its head seated against the inside face of the plate, said members each including a shank portion having a smaller cross-sectional area than the area of the hole and extending through said holes.

2. An apparatus of the character recited in claim 1, in which the headed members are cotter pins.

3. An apparatus of the character recited in claim 1, in which the ends of the shank portions project through the holes and are flared to resist withdrawal from the holes upwardly.

4. A feeding apparatus for granular material comprising, in combination, a hopper having a discharge opening, a plate bridging said opening, said plate having material passageways therein through which said material is discharged, means to vibrate said plate, and a plurality of wobble pins one loosely suspended in each passageway to prevent clogging of said passageways.

5. A supply and feeding apparatus for granular material comprising, in combination, a container having a discharge opening, a closure for said opening, said closure having discharge passages therethrough, and a plurality of disconnected elongated members supported at their upper ends by said closure and extending loosely through each passage.

6. A supply and feeding apparatus for granular material comprising, in combination, a hopper to receive granular material, said hopper having a discharge opening in its bottom, a floor plate in said opening, means to oscillate said floor plate, said floor plate having a scattering of passageways therethrough, and a pin loosely suspended in each passageway, said pins each having a cross-sectional area considerably smaller than the area of the passageway within which it is mounted.

7. A supply and feeding apparatus of the character recited in claim 6 in which the pins have enlarged heads seated on and extending above the top surface of the floor plate.

8. An apparatus for dispensing powdered material comprising a container for said material, said container having a material discharge opening, a plate bridging said opening, said plate having a plurality of holes therein through which material is discharged, means to vibrate said plate, and a plurality of headed members one seated in each hole, said members each including a shank portion having a smaller cross sectional area than the area of the hole in which it is seated and extending through said holes and a head which is wider than the hole in one dimension parallel to the plane of the hole, and narrower in another dimension parallel to the plane of the hole, so as to leave a portion of the hole uncovered.

9. A supply and feeding apparatus for granular material comprising, in combination, a container having a discharge opening, a closure for said opening, said closure having discharge passages therethrough, elongated members one extending loosely through each passage, and means to vibrate said closure and cause the members to wobble in said passages.

10. An apparatus for dispensing granular material comprising, in combination, a container adapted to contain the granular material, said container having an opening, a plate mounted in said opening, said plate having material discharge passageways therethrough, a plurality of disconnected agitator members one suspended loosely over and depending through each passageway, and means to vibrate the container and the plate so as to cause the agitator members to wobble freely in the passageways.

11. An apparatus for dispensing granular material comprising, in combination, a container adapted to contain the granular material, said container having an opening, a plate mounted in said opening, said plate having material discharge passageways therethrough, cotter pins one mounted loosely in each passageway, and a means to vibrate the container and the plate so as to cause the cotter pins to wobble freely within the passageways.

12. An apparatus of the character recited in claim 11, in which the cotter pins have their heads seated on the top surface of said plate.

13. An apparatus for dispensing granular material comprising, in combination, a container adapted to contain the granular material, said container having an opening, a plate mounted in said opening, said plate having material discharge passages therethrough, agitator members one mounted loosely in each passageway, and separate means to vibrate the container and to vibrate the plate so as to cause the agitator members to wobble freely within the passageways.

14. An apparatus for dispensing granular material comprising, in combination, a container adapted to contain the granular material, said container having an opening, said plate having material discharge passageways therethrough, agitator members one mounted loosely in each passageway, said agitator members each having a head seated on the plate and being of sufficient length to extend below the bottom surface of said plate, and means to vibrate the plate so as to cause the agitator members to wobble within the passageways.

15. A supply and feeding apparatus as recited in claim 14 in which the extended ends of said members are flared to prevent their displacement upwardly.

References Cited in the file of this patent

UNITED STATES PATENTS

| | | |
|---|---|---|
| 13,893 | Wells | Dec. 4, 1855 |
| 92,401 | Thompson | July 6, 1869 |
| 328,756 | Boyd | Oct. 20, 1885 |
| 836,748 | Gallisath | Nov. 27, 1906 |
| 936,224 | Dimick | Oct. 5, 1909 |
| 1,312,302 | Benjamin | Aug. 5, 1919 |
| 1,691,261 | Wilson | Nov. 13, 1928 |
| 2,729,362 | Hughes | Jan. 3, 1956 |